United States Patent [19]

Carbone et al.

[11] Patent Number: 5,316,522

[45] Date of Patent: May 31, 1994

[54] AXIALLY-ENGAGED, ABRASION-RESISTANT SPLIT SPROCKET ASSEMBLY

[75] Inventors: John J. Carbone, Metairie; James O. Gundlach, New Orleans, both of La.

[73] Assignee: The Laitram Corporation, Harahan, La.

[21] Appl. No.: 26,555

[22] Filed: Mar. 3, 1993

[51] Int. Cl.5 .............................................. F16H 55/12
[52] U.S. Cl. ...................................... 474/95; 474/164; 474/903
[58] Field of Search ...................... 474/95–99, 474/152, 160, 164, 273, 902

[56] References Cited

U.S. PATENT DOCUMENTS

| | | | |
|---|---|---|---|
| 184,540 | 11/1876 | Mills . | |
| 519,331 | 5/1894 | Hodge | 474/96 X |
| 1,201,748 | 10/1916 | Luce . | |
| 1,391,719 | 9/1921 | Conyngham . | |
| 1,835,406 | 5/1922 | Kirsten . | |
| 2,361,131 | 10/1944 | Smith | 198/109 |
| 2,451,690 | 10/1948 | Oehler | 74/243 |
| 3,106,101 | 10/1963 | Harriman | 474/96 |
| 3,724,285 | 4/1973 | Lapeyre | 74/243 |
| 3,815,439 | 6/1974 | Tarutani | 474/160 X |
| 4,049,112 | 9/1977 | Tyslauk | 198/834 |
| 4,089,406 | 5/1978 | Teske et al. | 198/730 |
| 4,741,724 | 5/1988 | Wang | 474/160 |
| 4,865,183 | 9/1989 | Hodlewsky et al. | 198/834 |
| 4,964,842 | 10/1990 | Howard | 474/152 |
| 5,037,356 | 8/1991 | Gladczak et al. | 474/95 |
| 5,061,225 | 10/1991 | Draebel | 474/95 |
| 5,158,505 | 10/1992 | Woyach | 474/95 |
| 5,170,883 | 12/1992 | Ledet et al. | 198/834 |

FOREIGN PATENT DOCUMENTS 429377  5/1991  European Pat. Off. ............ 474/900

Primary Examiner—Ramon S. Britts
Assistant Examiner—Roger J. Schoeppel
Attorney, Agent, or Firm—James T. Cronvich

[57] ABSTRACT

Split sprocket wheels having interlocking tabs for forming a sprocket wheel assembly that is easy to install on and remove from a drive or idler shaft of a belt or chain conveyor. The invention provides thin, durable sprocket wheels split into at least two sectorial sections along seams extending from a central bore to an outer engagement surface. Mating tabs and receptacles at the edges of adjacent sectorial sections interlock the adjacent sections radially and circumferentially. Holes in the vicinity of the mating tabs and receptacles of adjacent interlocked sections admit locking means for holding the sectorial sections together in axial compression. The sprocket wheels can be ganged together at selected positions along a shaft with their bores in coaxial alignment by means of spacers interconnecting consecutive sprocket wheels along the shaft. Sprocket wheels can be disengaged for removal from the shaft by loosening the locking means and sliding one section axially with respect to the other section by a distance as little as the thickness of the thin sprocket wheel.

33 Claims, 5 Drawing Sheets

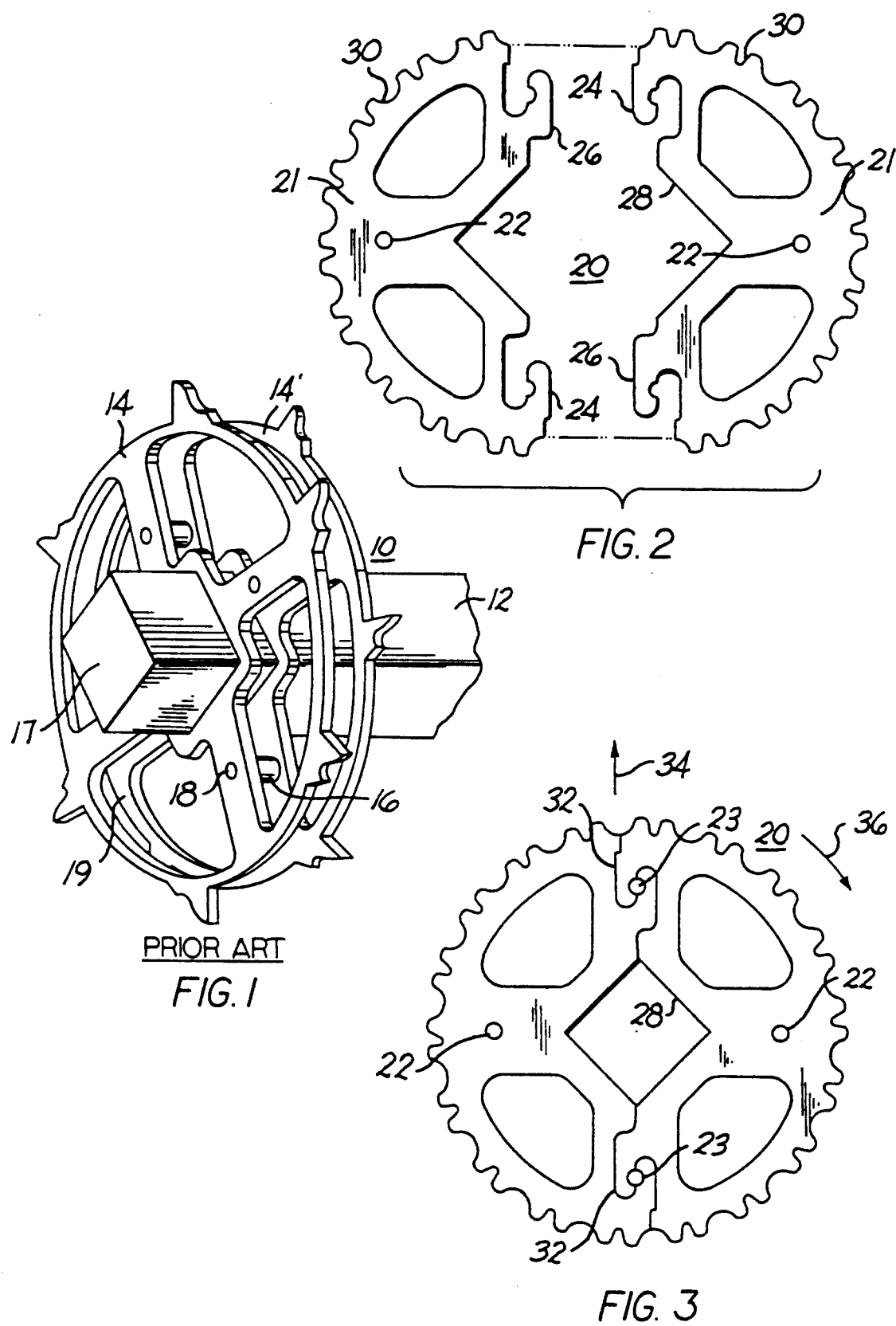

AXIALLY-ENGAGED, ABRASION-RESISTANT SPLIT SPROCKET ASSEMBLY

FIELD OF THE INVENTION

The invention relates to sprockets for linked conveyor belts or chains and, more particularly, to split sprocket wheels made of abrasion-resistant material and axially engageable into a sprocket assembly easy to install on and remove from a shaft for driving a modular plastic conveyor belt.

BACKGROUND OF THE INVENTION

When a sprocket used to drive or support a linked conveyor belt wears, it must be removed from the shaft on which it is mounted and replaced. In abrasive environments, sprocket wear is especially exacerbated. The task of replacing the worn sprocket can be time-consuming, especially if the shaft has to be separated from the conveyor frame so that the worn sprocket can be pulled off the shaft and a new one slid into position. Split sprockets having multiple sections were developed to alleviate the problems encountered in changing sprockets. The multiple sections can be disengaged and removed from the shaft without dismounting the shaft.

B. G. Mills, in U.S. Pat. No. 184,540, shows a sprocket wheel with a removable portion for easy replacement on a shaft. The removable portion dovetails with the rest of the sprocket wheel in a tight fit. The thickness and mass of the wheel section with respect to the removable portion, along with the closely machined dovetail joint, are crucial to retaining the removable portion in place. Because removal requires that the removable portion be driven from its tight fit, such a sprocket wheel is not feasible in situations requiring a number of closely spaced sprocket wheels on a shaft.

A sectional gear wheel, invented by W. B. Conyngham and shown in U.S. Pat. No. 1,391,719, comprises two half-wheels with circumferential flange extensions about the shaft. The two halves are bolted radially together through the flange extensions at a hub extending axially away from the wheel. The bolts also lock the wheel in place on the shaft, preventing the wheel from floating along the shaft as is often desirable in modular plastic conveyor belt systems.

U.S. Pat. No. 5,037,356 to Gladczak et al. shows molded plastic split sprocket halves held together by bolts through aligned, diagonal fastener sleeves. The fastening mechanism of the Gladczak split sprocket is not designed for use with thin sprocket wheel disks useful in abrasive environments.

A split sprocket capable of being installed on and removed from a shaft in a direction perpendicular to the shaft is shown in U.S. Pat. No. 5,279,526, filed Dec. 19, 1992 in the name of James O. Gundlach and assigned to the assignee of this invention. The Gundlach sprocket halves are retained by bolts through axial overlapping flanges of the joined halves. While such sprockets are excellent for servicing in tight quarters, they must be thick enough to provide strong overlapping flanges. If made of metal, such sprockets are heavy; if made of plastic, such sprockets are susceptible to wear in abrasive environments.

Thus, one object of the invention is to provide a long-life sprocket for use in abrasive environments.

U.S. Pat. No. 4,049,112 to W. Tyslauk shows a split sprocket for a chain drum. The sprocket comprises two identical sections each having axial annular shoulders. Locking disks, which have axially extending lips embracing the annular shoulders of the sprocket sections, and other locking hardware are required to hold the sprocket sections together. Such an assembly is not readily separable into two mating sprocket halves.

A conveyor chain sprocket in which a sectional tooth rim is clamped between two hub portions on a drive shaft is the subject of U.S. Pat. No. 5,061,225 to Jorgen Draebel. Although Draebel's hub portions, which are connected against each other, can be loosened to remove worn tooth rim sections without disassembling the shaft, replacement or installation of the circular hub portions requires that the shaft be disassembled. Furthermore, the hub portions and the locking hardware must exert enough pressure on the tooth rim sections to prevent them from separating under load.

Chain-drive sprocket assemblies shown in U.S. Pat. No. 1,201,748 to T. C. Luce and others shown in U.S. Pat. No. 1,835,406 to K. F. J. Kirsten comprise stacks of similar, staggered sprocket wheels. Sprocket assemblies comprising connected gangs of individual laminar sprocket wheels spaced apart along a drive shaft are shown in U.S. Pat. No. 5,170,883 to Brent A. Ledet et al. and assigned to the assignee of this invention. The ganged Ledet sprockets are particularly useful in modular plastic conveyor applications requiring frequent cleaning. All of these stacked or ganged sprocket assemblies can be removed and installed only by sliding them along the shaft and on and off the ends of the shaft, an operation that can be inconvenient, time-consuming, and costly.

Thus, a further object of the invention is to simplify the replacement of sprocket assemblies on the shafts of linked conveyor belt systems.

SUMMARY OF THE INVENTION

The invention solves the prior art problems and shortcomings and meets its objectives by providing an abrasion-resistant sprocket wheel assembly that can be installed on and removed from a drive or idler shaft without the need for dismounting the shaft from conveyor equipment to which it is attached. The sprocket wheel assembly includes an individual sprocket wheel or two or more sprocket wheels ganged together. Each sprocket wheel is preferably made of durable, abrasion-resistant material in the form of a thin disk extending from a central axial bore to a peripheral toothed engagement surface for engaging a conveyor belt. The central axial bores of the sprocket wheels are maintained in coaxial alignment along the shaft. For a ganged sprocket wheel assembly, spacers between consecutive sprocket wheels along the shaft maintain their relative positions. Each of the sprocket wheels is further split into at least two sectorial sections along seams extending from the central bore to the outer engagement surface and straight through the thickness of the sprocket wheel. Mating structure in the form of tabs at the edges of adjacent sectorial sections interlock the adjacent sections radially and circumferentially. In one embodiment, holes intersecting the seams between adjacent interlocked sections admit locking means for holding the sectorial sections together in axial compression with interlocking tabs forming a generally S-shaped seam when engaged. An entire group of ganged sprocket wheel sectors can be disengaged from an interlocked group by loosening the locking means through the mounting holes in the seams and sliding one group slightly axially relative to the other group. Then each disengaged group can be individually removed from the shaft.

In another embodiment, better adapted to unganged, individual sprocket wheels, a thin, abrasion-resistant, toothed disk sectorial section interlocks radially and circumferentially with adjacent disk sectorial sections by means of mating structure at the ends of the sections. Each disk section is sandwiched between sectorial side plates attached to each side of the disk section and forming part of the bore wall for the drive shaft. The side plate portion on one side of the disk sectorial sections subtends a sector extending circumferentially outward beyond, and forming a backing for, the mating structure at each end of the disk section. The side plate portion on the other side does not extend as far as the mating structure so as not to interfere with the axial engagement of adjacent sandwiched disk sections. Securing means through the mating structure of engaged disk sections lock adjacent sectors together into a complete sprocket.

BRIEF DESCRIPTION OF THE DRAWINGS

In the accompanying drawings, wherein like features are given similar reference characters in the several views to facilitate comparison:

FIG. 1 is a partial perspective view of a prior art ganged sprocket wheel assembly mounted on a drive shaft;

FIG. 2 is a side view of two sprocket wheel halves in accordance with the invention;

FIG. 3 is a side view of the sprocket wheel of the invention with the two halves interlocked, illustrating the seam;

DETAILED DESCRIPTION OF THE INVENTION

Figure 6:
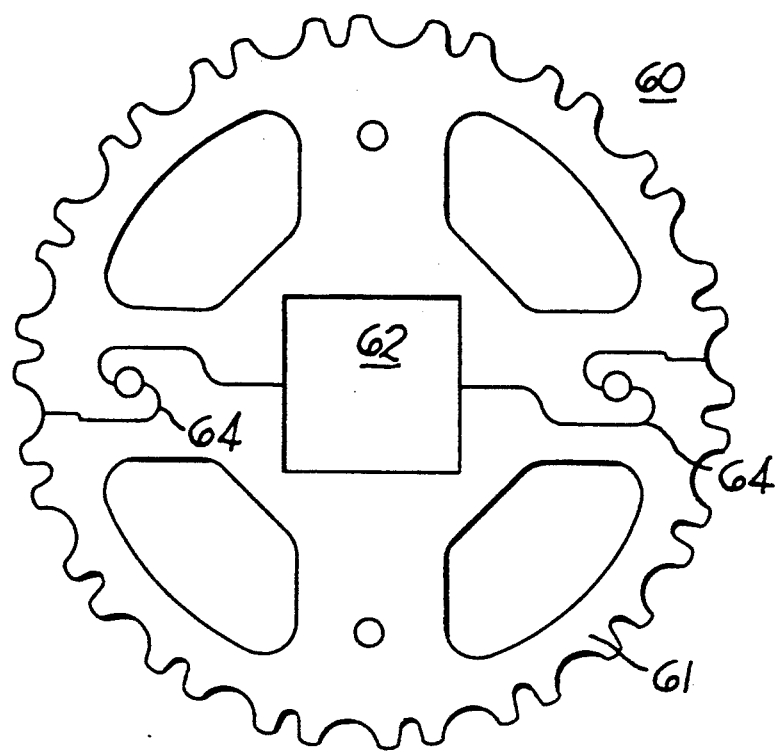
FIG. 6 is a side view of another embodiment of the split sprocket wheel of the invention.

A conventional ganged sprocket wheel assembly for driving a modular plastic conveyor belt is shown in FIG. 1. The sprocket wheel assembly 10 comprises two thin sprocket wheels 14, 14' spaced apart by intermediate spacers 16 and secured together by means of screws or bolts 18. Coaxially aligned bores 19 through the center of the sprocket wheels 14, 14' accommodate a drive shaft 12. The sprocket assembly 10 is installed on the shaft 12 by further aligning the aligned bores 19 of the sprocket assembly with the shaft and sliding the assembly over the end 17 of the shaft. The sprocket assembly 10 is removed from the shaft 12 by sliding it along the shaft 12 and off the end 17. Typically, before sprocket installation or removal, the drive shaft 12 must first be dismounted from conveyor equipment to which it is attached, a time-consuming task.

Split sprocket wheels in accordance with the present invention are shown in FIG. 2 and FIG. 3. A sprocket wheel 20 comprises two half-wheels 21 spanning 180° sectors. The wheel 20 extends from an inner edge 28 forming, in this case, a square bore 29 to an outer toothed driving surface 30 for engaging a conveyor belt or chain. The sprocket wheel can be made from many materials, but, for abrasion resistance, is preferably made of stainless steel, which is strong enough to permit the sprocket wheel to be relatively thin and yet capable of driving a conveyor belt. The sprocket wheel 20 is divided into the two half-wheels 21 along a seam 32. The generally S-shaped seam 32 defines a pair of mating, interlocking tabs 24, 26. Each tab 24, 26 includes finger-like protrusions projecting from each end of the half-wheels 21. The protrusion of one tab 24 projects toward the inner edge 28; the protrusion of the other tab 26 projects toward the outer driving surface 30. The interlocked tabs 24, 26 prevent the sprocket halves 21 from disengaging radially in the direction indicated by arrow 34 or circumferentially in the direction of circular arrow 36. Because the interlocked tabs 24, 26 do not overlap in the axial direction, the sprocket wheel halves 21 can be disengaged by a slight relative axial displacement along the drive shaft. Mounting holes 22, 23 formed in the sprocket wheel halves 21 are used to connect adjacent similar sprocket wheels together to form a ganged sprocket assembly. Some of the holes, namely holes 23, are intersected by the seam 32 to permit easy assembly and disassembly of ganged sprocket wheel halves, as described in more detail hereinafter.

Figure 4:
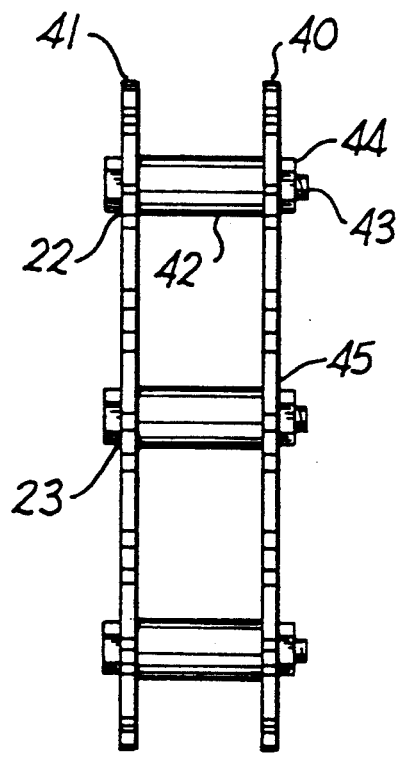
FIG. 4 is an edge view of a ganged sprocket wheel assembly in accordance with the invention.

As shown in FIG. 4, two thin sprocket wheels 40, 41 of constant thickness are spaced apart a selected distance by spacers 42 and secured by nuts 44 and threaded rods, such as bolts 43, to form a ganged sprocket wheel assembly. The spacers 42 include a central passageway 45 axially aligned with the sprocket holes 22, 23 to accommodate the bolt 43. The spacer 42, nut 44, and bolt 43 through intersected hole 23 also serve to lock the two adjacent half-wheel portions together in axial compression.

Figure 5:
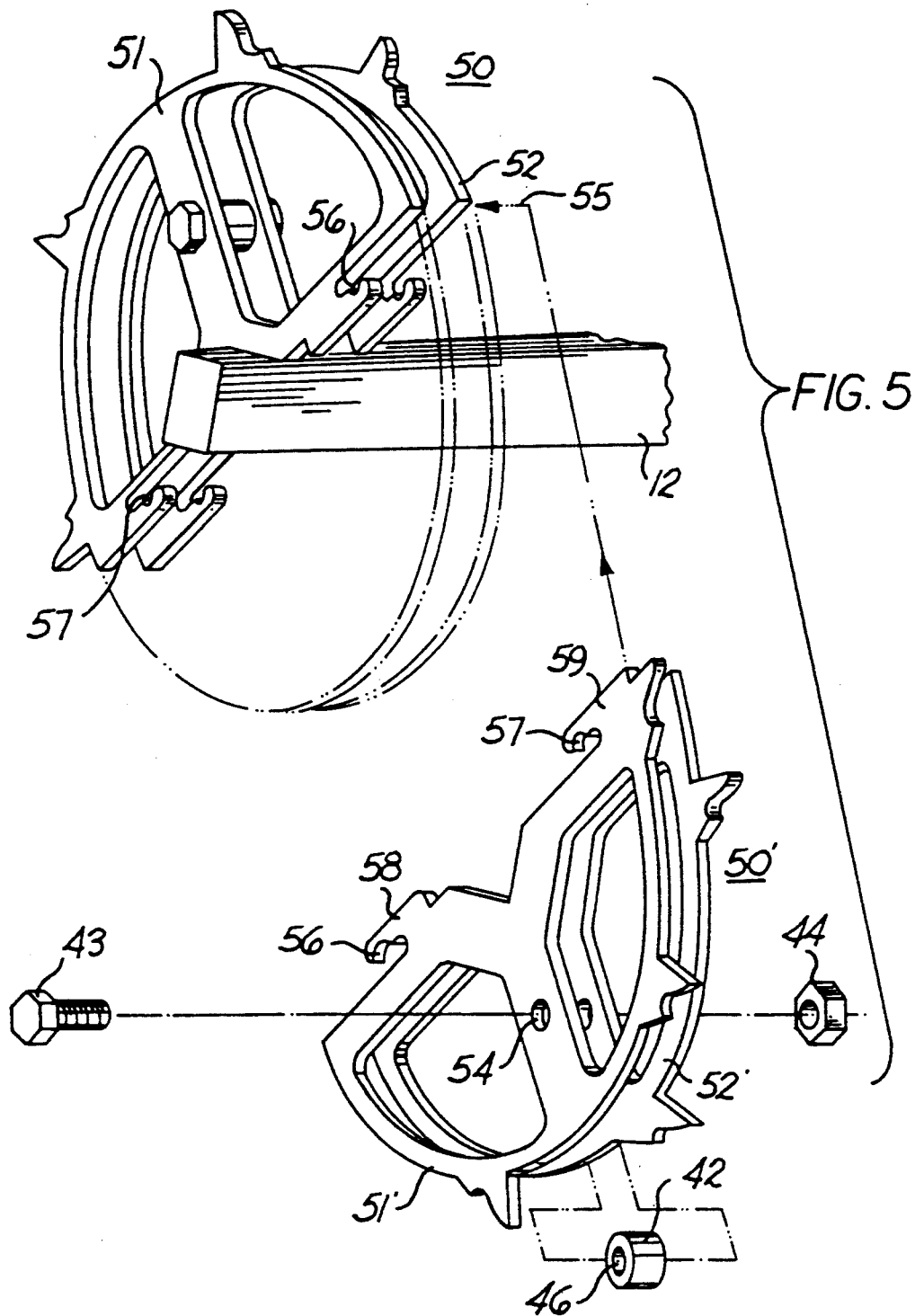
FIG. 5 is a partial perspective view of two halves of the ganged sprocket wheel assembly of the invention, illustrating the method of installation on and removal from a drive shaft.

The ease with which the sprocket wheel assembly of the invention can be installed on a shaft is illustrated in FIG. 5. Two sprocket wheel assembly halves 50, 50', each comprising a pair of sprocket wheel portions 51, 52 and 51', 52' separated a fixed distance by a spacer 42, are secured by a nut and bolt through aligned mounting holes 54 and the passageway 46 through the spacer 42. One of the sprocket wheel assembly halves 50 is positioned on the shaft 12. The other sprocket wheel assembly half 50' is positioned on the opposite side of the shaft 12 and offset slightly from the other assembly half 50, so that it can be positioned on the shaft without interference. As indicated by arrow 55, sprocket wheel assembly half 50' can be slid axially into mating position with the other sprocket wheel assembly half 50. Semi-circular notches 56, 57 in the tab portions 58, 59 of the sprocket wheels form mounting holes when in mating relationship with the other sprocket wheel half. Spacers 42, bolts 43, and nuts 44 can be installed in conjunction with the mounting holes formed by the mated notches 56, 57 to secure the sprocket wheel assembly on the shaft 12. The shoulders of the washer 42, the nut 44, and the head of the bolt 43 span the seam between the two interlocked sprocket wheel portions, thereby preventing their axial disengagement.

The sprocket assembly 52, 52' is removed from the shaft by loosening and removing the nuts 44 and bolts 43 attached along the seam formed at the interlocked tabs 56, 57. Then one sprocket half can be moved slightly axially along the shaft 12 until the two halves disengage, whereupon the two sprocket wheel assembly halves 50, 50' can be removed completely from the shaft 12 without dismounting the shaft from the conveyor system.

As shown in FIG. 2 and FIG. 3 the interlocking tabs 24, 26 form a generally S-shaped seam 32 between the interlocked sprocket portions 21. The seam 32 extends from a corner of the bore 29 to the outer driving surface 30 of the sprocket 20. The smooth curve of the S-shaped seam 32 helps distribute forces along the seam between the interlocked sprocket wheel portions 21 without concentrating them at discrete points, as could occur with a jagged seam. (The jogs in the seam 32 near the outer driving surface 30 and near the inner edge 28 are manufacturing preferences not critical to the invention.) The S shape also provides interlocking overlap in the radial and circumferential directions to prevent relative motion of the sprocket wheel portions 21 in those directions. Because the seam 32 is straight through the sprocket wheel 20 without axial overlap, there are no hidden surfaces as viewed from the side of the sprocket wheel. In this way, the belt is easy to inspect for dirt and other contaminants and to clean, if necessary.

Another embodiment of the sprocket wheel of the invention is shown in FIG. 6. In this embodiment the sprocket wheel 60 is split along a seam 64 intersecting the square bore 62 along the sides rather than the corners of the bore. Because the driving forces are greater near the corners of the bore, a sprocket wheel split along this seam exhibits less tendency to separate along the seam 64.

Although the invention was described with respect to sprocket wheel assemblies comprising only a pair of split sprocket wheels, in which the sprocket wheels comprise identical sprocket wheel halves, one skilled in the art will appreciate that more than two split sprocket wheels can be ganged together and that each sprocket wheel could comprise more than two sprocket wheel portions.

Figure 7A:
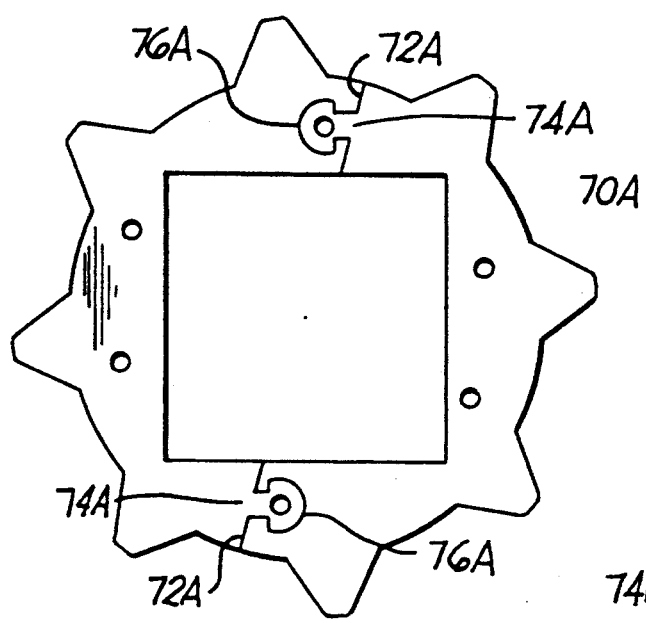
FIGS. 7A-7C are side views of other split sprocket wheel embodiments having various seam patterns in accordance with the invention.
Figure 7B:
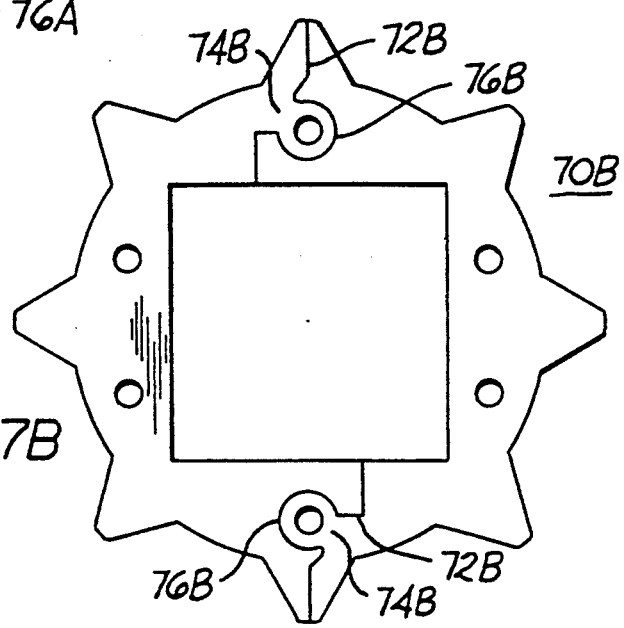
Figure 7C:
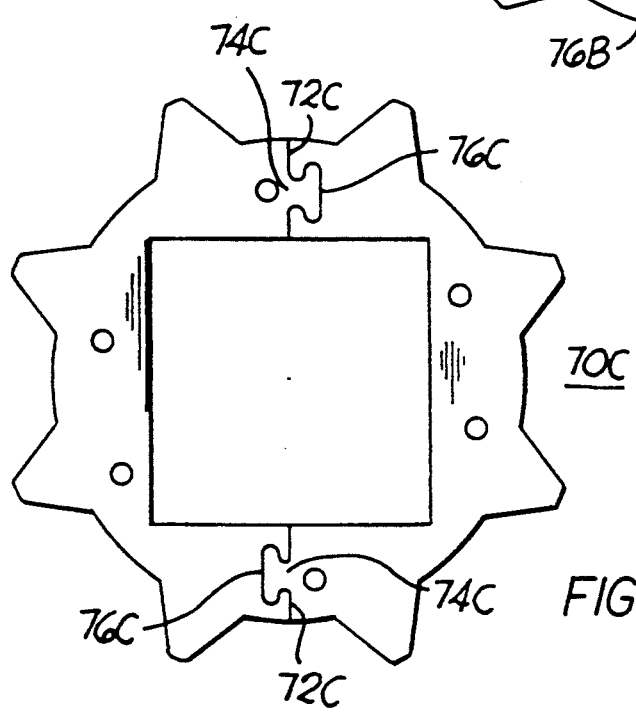

FIGS. 7A-7C show other split sprocket embodiments 70A-70C having various seam patterns. In these patterns, the seams 72A-72C are defined by mating structure at the ends of interlocked sectorial sections, the mating structure taking the form of tabs 74A-74C and mating receptacles 76A-76C. As in the case of the embodiment shown in FIG. 3, the seams 70A-70C are generally smooth and rounded, the mating structure having few sharp points and few isthmuses narrow in the radial and circumferential directions that are susceptible to concentrated forces capable of causing deformation or metal fatigue.

Figure 8:
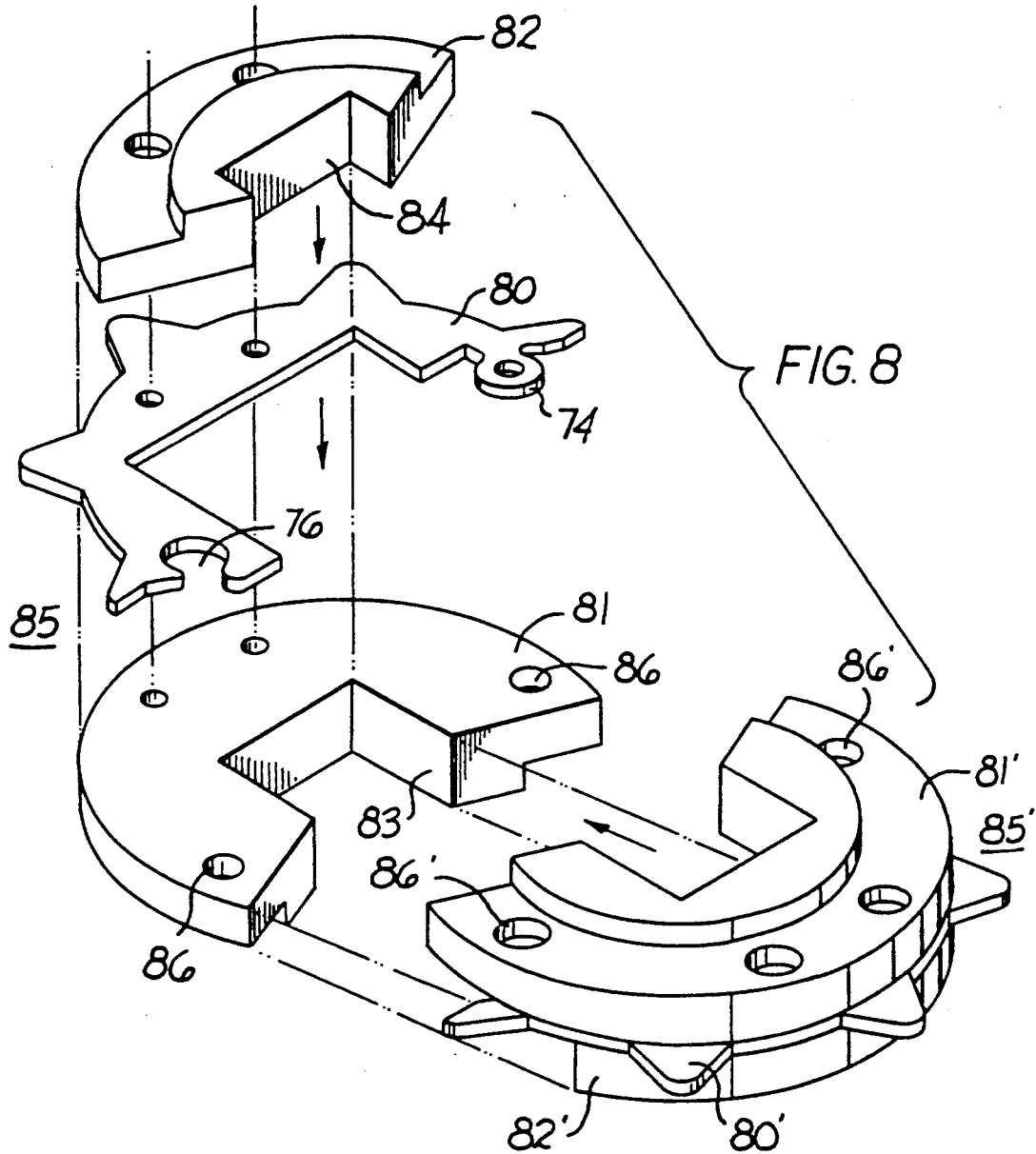
FIG. 8 is an exploded perspective view of an alternative sprocket wheel assembly having attached side plates.

It is possible, as shown in FIG. 8, to form an easy-to-install split sprocket wheel using split sprocket wheel sectorial sections 80 sandwiched between first and second side plates split into first and second side plate portions 81, 82 to form a wheel section 85. Each side plate portion 81, 82 is attached to a side of the split sprocket wheel 80. The first side plate portion 81 extends beyond, and provides a backing flange for, the mating structure (tab 74 and receptacle 76) on one side at both ends of the split sprocket section 80. The first side plate also forms a locking hole 86 in the flange portion of the plate. The second side plate portion 82 spans a smaller sector and does not extend into or beyond the mating structure, so that it does not interfere with the first side plate portion 81' of an interlocking adjacent section 80', but rather complements it. The side plate portions 81, 82 can be made of machined plastic and attached to the split sprocket by nuts and bolts or could be a unitary plastic piece molded over a split sprocket sector 80. The side plate portions 81, 82 can be thicker where needed for strength, such as in the central, shaft-driven region as shown in FIG. 8, or can be of uniform thickness. The side plate portions 81, 82 can include central surfaces 83, 84 forming a bore wall or hub to accommodate a drive shaft. In this way, the toothed split sprocket wheel section 80 can be stabilized on a shaft by the thicker drive bore formed by the side plate portions 81, 82, making the split sprocket formed thereby readily usable in a stand-alone configuration. Furthermore, if sprocket wheel sections 80 with large central openings are manufactured, a single sprocket wheel version can be used with side plates having various bores to accommodate different shaft sizes and shapes.

Because no two seams of the first side plate, the second side plate, or the sprocket overlap along any given axial line, the split sprocket sections 85, 85' may be installed easily on a shaft by: 1) positioning a first sprocket half 85 on the shaft; 2) positioning a second sprocket half 85' on the shaft but offset axially from the first half 85 with the flanged longer side plate portions 81, 81' toward opposite ends of the shaft; 3) sliding the sprocket halves 85, 85' together until the mating structure engages, overshooting being precluded by the stopping effect of the longer side plate portion abutting the mating structures; and 4) locking the two halves together in axial compression by nuts and bolts, for example, through fastening holes 86, 86' formed near ends of the longer side plate portions 81, 81'. The process is reversed for removal. Although the side plates form relatively broad driving surfaces for stability on the shaft, the axial offset required in installing and removing the split sprocket is just the thickness of the thin, toothed section, not the thickness of the side plates. Consequently, installation and removal in tight quarters is possible.

Many embodiments other than those specifically described herein can be carried out without departing from the scope of the invention, which is intended to be limited only by the following claims.

What is claimed as invention is:

1. A sprocket wheel assembly for a linked conveyor belt and mountable on a shaft, comprising interfitted sectorial wheel sections having first and second sides, each of said sectorial wheel sections extending between the first and second sides from an inner edge forming part of a noncircular shaft-accommodating opening to an outer circumferential belt-driving edge, each of said sectorial wheel sections spanning a sector from a first end to a second end, the first end including an integral tab portion and the second end including an integral tab-receiving portion for interfitting with a mating tab-receiving portion and a tab portion of an adjacent sectorial wheel section in abutting relationship along an interface straight through the interfitted sectorial wheel sections from the first side to the second side, the sprocket wheel assembly further including means for removably securing adjacent interfitted sectorial wheel sections together to form a sprocket wheel, said means for removably securing being spaced apart from the shaft and removably engaging the sprocket wheel sections primarily on the first and second sides at the tab portions of adjacent interfitted sectorial wheel sections and removably retaining the adjacent sectorial wheel sections flush.

2. The sprocket wheel assembly of claim 1, comprising a flat disk-like wheel of constant thickness.

3. The sprocket wheel assembly of claim 1, comprising two identical half-sprocket wheel sections.

4. The sprocket wheel assembly of claim 1, wherein the tab portion at the first end of a sprocket wheel sectorial section comprises a finger-like protrusion projecting toward the outer circumferential edge and wherein the tab-receiving portion at the second end of a sprocket wheel sectorial section comprises a finger-like protrusion projecting toward the inner edge.

5. The sprocket wheel assembly of claim 1, wherein said means for securing comprises compression means and a first shoulder portion held in compression against the first side of the sprocket wheel by said compression means and a second shoulder portion held in compression against the second side of the sprocket wheel by said compression means.

6. The sprocket wheel assembly of claim 1, further comprising an engagement surface at the inner edge defining an axial bore through the sprocket wheel from a first side to a second side for engaging the surface of a shaft.

7. The sprocket wheel assembly of claim 6, further comprising an intermediate portion having a plurality of holes extending therethrough from the first side to the second side and parallel to the bore and wherein each of the interfaces between adjacent sectorial wheel sections intersects one of the holes.

8. The sprocket wheel assembly of claim 1, further comprising:

a first flange attached to a first side of each of said sectorial wheel sections, a portion of said first flange extending circumferentially past the first end of said sectorial wheel section; and a second flange attached to the first side of said sectorial wheel section, a portion of said second flange extending circumferentially past the second end of said sectorial wheel section, said first flange and said second flange providing axial backing for said tab portion at the first end and said tab-receiving portion at the second end respectively, whereby adjacent interfitted sectorial wheel sections are interfittable from only one axial direction.

9. The sprocket wheel assembly of claim 8, further comprising a hub portion attached to the first side of each of said sectorial wheel sections, said hub portion extending radially inward past the inner edge of said sectorial wheel section along the first side thereof to an interior surface of said hub portion forming a central axial bore wall for engaging the shaft.

10. The sprocket wheel assembly of claim 9, wherein said hub portion and said first and second flange portions are each integrally formed of the same material.

11. The sprocket wheel assembly of claim 9, further comprising a complementary hub portion attached to the second side of said sectorial wheel section and extending radially inward past the inner edge of said sectorial wheel section along the second side thereof to an interior surface forming a complementary part of a substantially complete central axial bore wall with the hub portion attached to the first side of an interfitted sectorial wheel section.

12. A sprocket wheel assembly for engaging a conveyor belt and mountable on a shaft, comprising:

a sprocket wheel having first and second sides terminating at their periphery in an outer engagement surface for engaging a conveyor belt and forming a central axial opening therethrough from the first side to the second side to accommodate a shaft;

said sprocket wheel being split into at least two sectorial sections along seams extending from the central opening to the outer engagement surface and straight through the thickness of the sprocket wheel, adjacent sectorial sections being interlocked radially and circumferentially by integral mating structure at edges of the sectorial sections defined by the seams between adjacent sectorial sections; and removable locking means for removably locking adjacent sectorial sections together, said removable locking means being an integral means spaced apart from the shaft at the integral mating structure and removably engaging said sprocket wheel primarily at the first and second sides, thereby removably retaining the sectorial sections in axial alignment.

13. The sprocket wheel assembly of claim 12, wherein said locking means comprises compression means and a first shoulder portion held in compression against the first side of said sprocket wheel by said compression means and a second shoulder portion held in compression against the second side of said sprocket wheel by said compression means.

14. The sprocket wheel assembly of claim 12, wherein the central axial opening of said sprocket wheel is defined by interior axial walls forming a bore for engaging the shaft, the sprocket wheel further comprising:

a plurality of said sprocket wheels coaxially aligned on the shaft through the bore of each of said sprocket wheels; and spacer means attached to said sprocket wheels between consecutive pairs of corresponding sectorial sections of said sprocket wheels aligned on the shaft, said spacer means maintaining the relative positions of said sprocket wheels, whereby, when said removable locking means is removed, said sprocket wheel assembly separates into sets of axially spaced corresponding sectorial sections retained at the relative positions by said spacer means.

15. The sprocket wheel assembly of claim 14, wherein each of said sprocket wheels comprises an intermediate portion having a plurality of holes extending therethrough from the first side to the second side and parallel to the bore, and wherein said locking means comprises:

a tubular spacer having an axial passage therethrough, the tubular spacer being axially positioned between and in contact with the facing sides of a pair of consecutive sprocket wheels along the shaft and aligned with holes in the consecutive sprocket wheels; and a threaded rod through the axial passage formed by the tubular spacer and the aligned holes of consecutive sprocket wheels, the threaded rod protruding from the outer first side of an endmost consecutive sprocket wheel and from the outer second side of the other endmost consecutive sprocket wheel and threadably held in compression by a nut at least one of said endmost consecutive wheels.

16. The sprocket wheel assembly of claim 15, wherein said threaded rod includes a head at one end, the head having a dimension greater than the diameter of the aligned hole through the endmost sprocket wheel, whereby the threaded rod retains the sprocket wheel assembly in adjustable compression as the nut is tightened.

17. The sprocket wheel assembly of claim 14, wherein said spacer means and said locking means are identical means.

18. The sprocket wheel assembly of claim 12, wherein said sprocket wheel comprises a flat disk-like wheel of constant thickness.

19. The sprocket wheel assembly of claim 12, wherein said sprocket wheel comprises an intermediate portion having a plurality of holes extending therethrough from the first side to the second side and parallel to the central axial opening and wherein each of the seams between adjacent sprocket wheel sections intersects one of the holes.

20. The sprocket wheel assembly of claim 12, wherein said sprocket wheel comprises two identical half-sprocket wheel sections.

21. The sprocket wheel assembly of claim 12, wherein said sprocket wheel comprises a multiple-sided inner surface forming the central axial opening and wherein said sprocket wheel is split along a seam extending from an interior point on at least two of the multiple inner surface sides.

22. The sprocket wheel assembly of claim 12, further comprising first and second side plates attached to the first and second sides of said sprocket wheel sandwiching said sprocket wheel therebetween with the outer engagement surface extending radially beyond said side plates, each of said first and second side plates having axial bore walls forming a central axial bore coaxially aligned with the central axial bore of the other side plate and with the central axial opening of said sprocket wheel, the bore walls being in driving engagement with the shaft, said first and second side plates extending radially from the bore walls to a peripheral edge and including backing structure abutting said mating structure, said first and second side plates being split along seams extending from the bore walls to the peripheral edge, the seams being arranged such that an imaginary line in the axial direction intersects at most one of the seams of said sprocket wheel, said first side plate, and said second side plate.

23. The sprocket wheel assembly of claim 22, wherein the bore walls of said first and second side plates form the axial bore having radial dimensions no greater than those of the central axial opening of said sprocket wheel.

24. The sprocket wheel assembly of claim 12, wherein said locking means comprises a flange attached to at least one of the sides of the sprocket wheel and abutting the mating structure.

25. The sprocket wheel assembly of claim 24, further comprising a hub portion attached to and extending axially outwardly from at least one of the sides of the sprocket wheel, said hub portion having inner axial bore walls for engaging the drive shaft.

26. The sprocket wheel assembly of claim 12, wherein the mating structure at a first edge of the sprocket wheel sectorial section comprises a tab portion protruding circumferentially outward at the first edge and wherein the mating structure at a second edge of the sprocket wheel sectorial section comprises a tab receptacle for mating with a tab portion of an adjacent interfitted sprocket wheel sectorial section.

27. A sprocket wheel assembly of the type having two or more sprocket wheels spaced from one another in coaxial alignment along a rotatable shaft by intermediate spacers, comprising an improved sprocket wheel comprising interfitted sectorial wheel sections, each of said sectorial wheel sections extending radially from an inner edge for engaging the surface of a rotatable shaft to an outer circumferential belt-driving edge, each of said sectorial wheel sections spanning a sector from a first end to a second end, each end including an integral tab portion for interfitting with an integral mating tab portion of an adjacent sectorial wheel section in abutting relationship, the sprocket wheel assembly further including means for removably securing adjacent interfitted sectorial wheel sections together to form a sprocket wheel, said means for removably securing being spaced apart from the shaft and spanning at least a part of the tab portion at the first end of a sectorial wheel section and at least part of the mating tab portion at the second end of the adjacent interfitted sectorial wheel section and retaining the adjacent sectorial wheel sections flush, said sprocket wheel assembly further comprising means for ganging corresponding sectorial wheel sections of individual sprocket wheels at preselected axial spacings, whereby, when said means for removably securing is removed, said sprocket wheel assembly separates into gangs of axially spaced sectorial sections retained at preselected axial spacings by said means for ganging.

28. In the sprocket wheel assembly of claim 27, said means for securing spanning at least a part of the tab portion at the first end of a sectorial wheel section and at least part of the mating tab portion at the second end of the adjacent interfitted sectorial wheel section and retaining the adjacent sectorial wheel sections flush.

29. In the sprocket wheel assembly of claim 28, said means for securing further comprising intermediate spacers for spacing the sprocket wheels at preselected intervals along the rotatable shaft.

30. The sprocket wheel assembly of claim 27, wherein said sprocket wheels comprise flat disk-like wheels of constant thickness.

31. The sprocket wheel assembly of claim 27, wherein said sprocket wheels comprise two identical half-sprocket wheel sections.

32. A sprocket wheel assembly for engaging a conveyor belt and removably mountable on a rotatable shaft aligned along a shaft axis, comprising:
   a first set and a second set of sectorial sprocket wheel sections ganged together at preselected axial intervals by means of spacers attached between facing sides of consecutive sprocket wheel sections;
   each of said sectorial sprocket wheel sections extending radially from an inner edge forming part of an axial shaft bore to an outer circumferential belt-driving edge and spanning a sector from a first end to a second end such that the first set and the second set of sectorial sprocket wheel sections can be installed on and removed from the shaft in a direction perpendicular to the axis of the shaft;
   each of said sectorial sprocket wheel sections of said first set having integral tabs at the first and second ends for interfitting with integral mating tabs at the first and second ends of corresponding sectorial sprocket wheel sections of the second set in abutting relationship such that the first and second sets can be put into and out of alignment on the drive shaft by relative axial displacement of the first and second sets; and securing means in spaced-apart relation to the shaft and engaging the sides of said sprocket wheel sections at the interfitted tabs for removably securing said first set to said second set of sectorial sprocket wheel sections when in alignment on the shaft.

33. A sprocket wheel assembly for engaging a conveyor belt and removably mountable on a rotatable shaft aligned along a shaft axis, comprising:

a sprocket wheel forming a central axial opening extending therethrough from a first side to a second side and having an outer circumferential belt engagement edge;

first and second side plates, each of said side plates having a peripheral edge and a central axial bore surface forming a central axial bore therethrough for engaging the shaft;

said first side plate being attached to the first side of said sprocket wheel, and said second side plate being attached to the second side of said sprocket wheel, thereby to form a stack of said first side plate, said sprocket wheel, and said second side plate with the outer circumferential belt engagement edge extending radially beyond the peripheral edges of said side plates;

said sprocket wheel being split into first and second interfitting sprocket wheel halves along seams extending from the central opening to the outer circumferential edge, each of the sprocket wheel halves spanning a sector from a first end to a second end and having mating structure at each end;

each of said first and second side plates being split into a longer side plate portion and a shorter side plate portion along seams extending from the central axial bore to the peripheral edge;

the longer side plate portion of the first side plate spanning a sector encompassing the first sprocket wheel half and the seams of said sprocket wheel, the longer side plate portion of the second side spanning a sector encompassing the second sprocket wheel half and the seams of the sprocket wheel;

each of the longer side plate portions and the sprocket wheel halves admitting locking means, whereby the locking means can be unlocked and the sprocket wheel assembly separated into two sprocket wheel sub-assemblies by their relative axial displacement, each sub-assembly comprising one of the sprocket wheel halves with a longer side plate portion attached to one side and a shorter side plate portion attached to the other side.

* * * * *